US005546110A

United States Patent [19]

Lewicki, Jr. et al.

[11] Patent Number: 5,546,110

[45] Date of Patent: Aug. 13, 1996

[54] ELECTROGRAPHIC PRINTING

[75] Inventors: Walter J. Lewicki, Jr., Lancaster, Pa.; John H. Bowers, Clarksburg, N.J.

[73] Assignee: Armstrong World Industries, Inc., Lancaster, Pa.

[21] Appl. No.: 151,881

[22] Filed: Nov. 15, 1993

Related U.S. Application Data

[63] Continuation-in-part of Ser. No. 14,744, Feb. 8, 1993, Pat. No. 5,347,296.

[51] Int. Cl.[6] .......................... G03G 15/01; G01D 15/06; B41J 2/415

[52] U.S. Cl. ............................ 347/115; 347/120; 347/119

[58] Field of Search .................................... 347/149, 140, 347/172, 111, 120, 119, 115

[56] References Cited

U.S. PATENT DOCUMENTS

| | | | |
|---|---|---|---|
| 4,233,612 | 11/1980 | Hirayama et al. | 347/140 |
| 4,450,489 | 5/1984 | Barry et al. | 347/149 |

*Primary Examiner*—Benjamin R. Fuller
*Assistant Examiner*—Raquel Yvette Gordon
*Attorney, Agent, or Firm*—James J. Ralabate

[57] ABSTRACT

This invention provides a process for electrographically imaging a plurality of substrates heretofore not usable in such a system. While prior art dielectric substrates could be used in the present process, the specific parameters outlined in this invention allows many more charge retentive surfaces or substrates to be used in electrostatic imaging. The process involves developing the latent electrostatic image before dissipation of the image charge which can be calculated by the inventive process for each substrate to be used.

34 Claims, 3 Drawing Sheets

ELECTROGRAPHIC PRINTING

This invention relates to electrographic printing and, more specifically, to a novel process for electrographic printing on a plurality of substrates. This application is a continuation-in-part application of parent application Ser. No. 08/014,744 filed in the U.S. Patent and Trademark Office on Feb. 8, 1993 U.S. Pat. No. 5,347,296.

BACKGROUND OF THE INVENTION

There are known several systems for electrostatically printing on receiving medias. One system is called xerographic or xerography which involves placing a uniform charge on a photoconductive element, selectively exposing this charge to light in image configuration to form a latent image, applying a marking material to the latent image and subsequently transferring the developed image to a receiving sheet such as bond paper or the like, and the image fixed by heat or pressure. This basic xerographic process is disclosed in U.S. Pat. Nos. to Carlson 2,297,691; Middleton 2,663,636; Bixby 2,970,906; Schaffert 2,576,047 and Middleton and Reynolds 3,121,006. This xerographic process is limited to functional photoconductive materials that will hold a charge in the dark and have the ability to have charge dissipation upon exposure. Only a limited number of materials having desirable photoconductive properties have been found commercially acceptable such as selenium, zinc oxide, cadmium sulfate and a few other inorganic and organic materials.

Another electrostatic imaging system heretofore used is called electrography. In this process a dielectric material is charged in image configuration by various means such as print heads, electron beams, electronic stencils or shaped masks. While photoconductive insulators will only hold an electrical charge in the dark, dielectrics can hold an electrical charge in the presence of visible light which makes them more practical for various commercial uses such as in manufacturing processes. There are various patents and publications which specifically define the parameters of electrography such as *Principles of Non-Impact Printing* by Jerome S. Johnson, Palatino Press, 18792 Via Palatino, Irvine, Calif. 92715 and U.S. Pat. Nos. 5,025,273; 5,124,730; 5,126,769 and 5,162,179. As in xerography, the electrographic process also has some inherent drawbacks. One such drawback is that the dielectric surface layer must have a capacitance per unit area of at least 200 picofarad (PF) per cm squared and a resistivity of at least $10^{14}$ ohms centimeters bulk resistivity in order to properly function. A further disadvantage of prior art electrographic systems is that the dielectric paper structure used comprises a conducting layer having a resistivity of about $10^7$ ohms centimeters having coated thereon an insulating dielectric layer of about $10^{14}$ ohms centimeters resistivity. The manufacture of this dielectric paper is a relatively complex and expensive process. Thus, only dielectric materials of specific resistivities, coated over required specific conductive layers could heretofore be used in electrography.

SUMMARY OF THE INVENTION

It is therefore an object of this invention to provide an electrographic imaging process devoid of the above-noted disadvantages.

Another object of this invention is to provide an electrographic imaging process which enables the use of a multitude of charge retentive substrates not heretofore available in electrography.

Still another object of this invention is to provide a process for electrographic imaging using specific process parameters for successful operation and results.

Yet another object of this invention is to provide an electrographic process which does not require a two layer substrate consisting of a dielectric layer of limited resistivity and a conducting layer also of restricted resistivity.

Another still further object of this invention is to provide a process with novel process parameters that will allow substrates heretofore not usable in electrography to be now used with good results.

The foregoing objects and others are accomplished according to this invention by providing a novel system or process for imaging in an electrographic system comprising depositing at a charge or image station a latent image directly on a charge retentive substrate, developing said substrate during a distance in said system from said charge station, said distance determined from the formula $$D=TC\times S\times QF$$

wherein:

D is equal to the distance between latent image deposition and completion of development in arbitrary units;

TC is the time constant of the charge retentive substrate in seconds;

S is the speed in the system of the substrate in the same units as D per second; and QF is equal to the number of time constants of the substrate used in the process.

As noted in the above process description, process parameters are used to provide a means of depositing a latent electrostatic image on a charge retentive substrate (such as plain paper) and developing or toning the latent charge created within a time which is less than that to substantially discharge a significant portion of the latent electrostatic image through any resistive paths in the substrate. Plain paper is one of the charge retentive substrates usable in the process of this invention. The term "plain paper" is meant to include any paper or paper equivalent which is of substantially uniform composition and particularly devoid of a layered structure; i.e. a dielectric layer and a conducting layer. An example of such a plain paper is xerographic bond paper used in photocopiers. However, other charge retentive surfaces and other "paper" than "plain paper" may be used in the present invention. By "paper" we mean any thin, flexible material that may be made into paper-like sheets which exists, at least, to serve the function of conveying printed or written information. In this invention, during the process of forming the electrostatic image and developing it, the paper is temporarily in contact with a conductive carrier. In lieu of this temporary contact, the "plain paper" could have permanent metalized backing if desirable. This metalized backing would act as the conductive carrier for the plain paper charge retentive surface. Also, a paper substrate containing one or more thin layers of polymeric films such as those prepared by extrusion coating and/or by film lamination are useful in this invention. In addition, multi-layered paper composites consisting of cellulosic layers, polymeric films including metalized films and/or metallic foils can be used. Also, substrates which consist of combinations of natural and man-made fibers, including organic and inorganic fibers, coated and uncoated, are likely alternates to plain paper as long as they meet the guidelines for forming an image in an electrographic system according to the formula and description and claims of this invention. However, it is preferred in this invention to use the temporary contact with the conductive carrier. The function of the conductive carrier is to provide an electrical return path and to set the absolute electrical potential of the non-imaged side of the paper. The same conductive carrier may also be used to provide a mechanical support mechanism for the paper and move it through the printer or printing process. As an alternative to plain paper, any prior art dielectric paper used in prior art electrographic processes or any conventional printable substrate with a dielectric surface including polymeric substrates with or without metalized backings may also be used in this invention provided the process parameters of this invention are followed. In this invention, all of these above-described substrates function as the dielectric capable of retaining an electrostatic latent image or function as the "charge retentive substrate".

The latent electrostatic image may be formed by any number of conventional means such as with an ionographic print head of the type manufactured by Delphax, an ion pin array such as that manufactured by KCR, an electron beam, electronic stencils or shaped masks, indirect charge transfer means, and any other means which are capable of depositing electronic charge at a rate sufficiently high to charge the paper to potentials that enable good development of the latent image with the desired toners. Development or toning of the latent electrostatic image may be accomplished with any of the conventional powder or liquid toners presently used in electrographic or electrophotographic printing or copying or any toner developed for a specific implementation of this invention. The required properties of the toner are only that it have a charge opposite to that deposited on the substrate, have a charge to mass ratio that will cause the required optical density to be developed according to the charge deposited and adhere to the paper in such a way as to give the imaged paper the required performance characteristics for its end application. Other toner parameters will be required according to the specific implementation of the invention depending upon, for example, whether a single component or two component powder developer system is used.

If the developed or toned visible image is to be permanently attached to the paper a fixing process may be used. The fixing process may be performed by any of the conventional approaches such as thermal fixing using a heated roller or flash fusing with a flash lamp; pressure fusing by applying pressure across the paper in a nip between two rollers; chemical fusing by exposing the toner to a solvent vapor or designing the toner to chemically bond to the paper; and/or by any other means by which the toner is made to be permanently attached to the paper. The fixing process is not a necessary step in this invention although it is likely to be included in most implementations of it.

A key parameter that governs the proper functioning of this electrographic printing process and printer is the "TC" electrical time constant of the paper. The definition of the electrical time constant, TC, is the time for which the voltage applied to a dielectric will discharge to a value which is 1/e of its original value, where e is 2.718282, the base of the natural logarithms. In other words, it is the time for a voltage applied to a dielectric to discharge to about 37% of its original value.

To calculate the time constant of a paper the following composite formula is used:

$$TC=\rho\times\epsilon_r\times\epsilon_o$$

wherein $\rho$=bulk resistivity of the material $\epsilon_r$=the dielectric constant of a paper $\epsilon_o$=the dielectric permitivity of free space approximates 8.85 picofarads (PF) per meter.

Taking, by example, a paper which has a resistivity of $10^{12}$ ohm-cm resistivity and a dielectric constant of 5, the time constant can be calculated as follows:

$$TC=(10^{10})\times5\times8.85\ 10^{-12}$$

=0.4425 seconds. To correctly cancel the length terms, one has to convert resistivity to ohm meter units. In other words, the standard resistivity measurements made in ohm-cm should be divided by 100.

QF determines the percentage of the charge (or voltage) that is desired to have remaining in the dielectric due to self discharge prior to completing development of the latent electrostatic image.

It does this by specifying the (fractional) number of electrical time constants during which the charge is allowed to discharge by leaking through the paper. Obviously, the shorter the time during which the-charge is allowed to leak away, the more charge remains. Because charge leakage is unlikely to be uniform the greater will be the percentage of remaining charge, the greater the accuracy of the resulting developed image. Furthermore, the more charge that needs to be deposited on the substrate, the less likely it is that it can be deposited accurately.

To determine the quality factor (QF) according to the percentage of charge desired to be remaining (RC), the following formula is used:

$$QF=\frac{1}{\ln}\left(\frac{1}{1-RC}\right)$$

For example, suppose it is decided that, 90% of the original charge should remain on the paper in order to obtain the desired quality of image.

Then QF is calculated to be equal to 0.434 using the above formula.

The paper has both electrical dielectric and resistive properties. The dielectric properties enable a latent electrostatic image to be deposited and retained on the paper. The resistance properties determine the rate that the charge of the latent electrostatic image is bled away from the original location of its deposition. A high resistivity is preferable to minimize the rate of charge bleed of the latent electrostatic image. The product of the dielectric constant of the paper and its resistivity determines the time constant of the paper. A large time constant is preferred to allow longer periods and/or larger distances to be used in the charge deposition and development process. Actually, there are two time constants that apply; the bulk time constant associated with the diffusion of charge through the bulk of the paper and the surface time constant associated with the diffusion of charge on the surface of the paper. The latter is usually somewhat shorter because of the exposure to humidity of the air and possibly to salts and other contaminants from handling. In this invention the time constant can be either or both of the bulk time constant and surface time constant. The time constant should be sufficiently long such that minimal discharge of the electrostatic image occurs between the time the charge is deposited and the image is fully developed. This may range from one time constant for black/white images to one-sixth or less time constant for the highest quality continuous color images. The relationship between the time the paper is charged and fully developed sets the dimensions and specific relationships of the printer. For example, for a one second time constant paper and a distance between the head and end of the development station of one foot, a 60 feet per minute speed is required for one time constant black/white or binary printing. For the same parameters but for the very highest quality gray-scale image where minimal charge leakage can be tolerated (0.17 time constants), a higher speed of 360 feet per minute is required.

Typical 3 mil thick paper with a dielectric constant of approximately 5 will have a capacitance of approximately 58 picofarads (PF) per square centimeter. In order to obtain a bulk time constant of 1 second a bulk resistivity of $2\times10^{12}$ ohms centimeters will be required. Bulk resistivity of typical electrographic paper is $10^{12}$ ohms centimeters at a nominal relative humidity of 50%. An increase in the bulk resistivity can be accomplished by heating the paper to reduce its water content. Alternately or in addition, the paper can be loaded with a hydrophobic polymer or a surfactant which causes the paper to be hydrophobic. A paper which uses either of these latter approaches or others to increase the paper resistivity should be relatively easy to obtain from a paper manufacturer at prices which are substantially the same as standard paper prices. With these papers, high quality continuous tone color images (0.33 time constants) can be achieved at 250 feet per minute with approximately 7.5 inches between deposition of the charge and completion of development.

Papers with bulk resistivities of $10^{14}$ ohms centimeters are achievable when loaded and/or coated with polymers and/or pigments. Commercially available papers with these resistivities in the dielectric layer of a two layer paper are typically used in electrostatic printers and plotters. Using paper with this resistivity, the highest quality continuous tone color images (0.17 time constant) can be achieved at 60 feet per minute with approximately 9 inches between deposition of the charge and completion of development.

As noted above, the formula for determining the critical parameters for implementing this invention is:

$$D=TC\times S\times QF$$

where D is equal to the distance between latent image charge deposition and development in arbitrary units, TC is the time constant of the paper in seconds, S is the speed of the paper web in the same units as D per second, and QF is equal to the number of time constants of the paper used in the process. One time constant yields a loss of 37% of the charge during the process, adequate for binary printing processes. One third time constant yields a loss of 5% of the charge during the process, adequate for continuous tone color printing processes where absolute color rendition is not important- One sixth time constant yields a loss of 0.25% of the charge during the process, adequate for continuous tone color printing processes where absolute color rendition is essential.

The non-impact printer apparatus of this invention comprises a system having in combination a substrate supply station, an imaging station having means to deposit a latent electrostatic image upon a charge retentive substrate, a developing station, a separation station, and means for controlling image development of said substrate with a distance in said system. This distance is determined from the formula:

$$D=TC\times S\times QF$$

Wherein:

D is equal to the distance between latent electrostatic image deposition and completion of development in arbitrary units;

TC is the time constant of the charge retentive substrate in seconds;

S is the speed in the system of the substrate in the same units as D per second; and QF is equal to the number of time constants of the substrate used in the process.

The distance D can be adjusted by conventional means including mechanical means according to the needs of the process, for example, to compensate for the speed S of the system or the resistivity or capacitance of the printable substrate.

The means for controlling the image development can be any suitable means such as a motor controlled positioner or adjuster including optically or servo controlled positioners.

The following examples illustrate specific values used in the formula of this invention, i.e. $D=TC\times S\times QF$:

The charts in Examples I and II show the calculations for a range of possible papers, speeds and qualities as in the formula above defining TC.

EXAMPLE I

Time Constant Calculations for Various Papers/Conditions

| | Paper 1 | Paper 2 | Paper 3 | Paper 4 | Paper 5 |
|---|---|---|---|---|---|
| dielectric constant | 5 | 5 | 5 | 8.5 | 8.5 |
| thickness (cm) | 0.00762 | 0.00762 | 0.00762 | 0.0762 | 0.0762 |
| capacitance/cm^2 (pf) | 58.018 | 58.018 | 58.018 | 0.986 | 0.986 |
| bulk resistivity (ohm cm) | 1.0E+12 | 1.0E+13 | 1.0E+14 | 1.0E+13 | 1.0E+14 |
| resistance cm^2 | 7.6E+09 | 7.6E+10 | 7.6E+11 | 7.6E+11 | 7.6E+12 |
| bulk time constant (TC) (sec) | 0.44 | 4.42 | 44.21 | 0.75 | 7.52 |

Example II

Distance Between Charge Deposition and Development Completion

| S = speed (ft/min) | TC = QF | 0.44 D inches | 4.42 D inches | 44.21 D inches | 0.75 D inches | 7.52 D inches |
|---|---|---|---|---|---|---|
| 30 | 1.00 | 2.65 | 26.53 | 265.26 | 4.51 | 45.09 |
| 30 | 0.33 | 0.88 | 8.84 | 88.42 | 1.50 | 15.03 |
| 30 | 0.17 | 0.44 | 4.42 | 44.21 | 0.75 | 7.52 |
| 60 | 1.00 | 5.31 | 53.05 | 530.52 | 9.02 | 90.19 |
| 60 | 0.33 | 1.77 | 17.68 | 176.84 | 3.01 | 30.06 |
| 60 | 0.17 | 0.88 | 8.84 | 88.42 | 1.50 | 15.03 |
| 125 | 1.00 | 11.05 | 110.52 | 1105.24 | 18.79 | 187.89 |
| 125 | 0.33 | 3.68 | 36.84 | 368.41 | 6.26 | 62.63 |
| 125 | 0.17 | 1.84 | 18.42 | 184.21 | 3.13 | 31.32 |
| 250 | 1.00 | 22.10 | 221.05 | 2210.49 | 37.58 | 375.78 |
| 250 | 0.33 | 7.37 | 73.68 | 736.83 | 12.53 | 125.26 |
| 250 | 0.17 | 3.68 | 36.84 | 368.41 | 6.26 | 62.63 |
| 500 | 1.00 | 44.21 | 442.10 | 4420.97 | 75.16 | 751.57 |
| 500 | 0.33 | 14.74 | 147.37 | 1473.66 | 25.05 | 250.52 |
| 500 | 0.17 | 7.37 | 73.68 | 736.83 | 12.53 | 125.26 |

DETAILED DESCRIPTION OF THE INVENTION INCLUDING PREFERRED EMBODIMENTS

Figure 1:
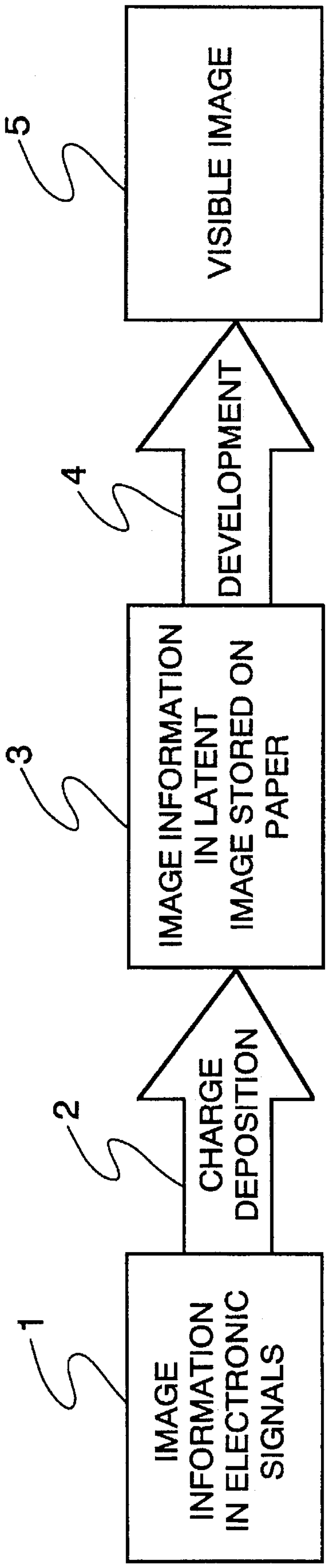
FIG. 1 is a description of the electrographic printing process of this invention in block diagram form.

In FIG. 1 a printing process is shown having three stages and two steps between them. The first stage 1 is that of having an image in some electronic form. For example, the image may be stored as a series of bytes in semiconductor memory. Conversion of the electronically stored information to a latent electrostatic image stored on the paper occurs by the step 2 of selectively depositing charge on the paper according to the electronically stored image. This may be accomplished by any suitable means including the means previously discussed. The requirements of the charge deposition process are that it be capable of delivering charge to the paper at a sufficiently high rate so as to be able to form electrostatic latent images which can be developed with suitable toners. For example, if a paper with a capacitance of 58 picofarads (PF) per square centimeter is used, latent electrostatic images with a maximum apparent surface potential of 250 volts are necessary to develop a good visible image, and a print speed of 125 feet per minute (63.5 centimeters per second) is used, the charge deposition means must be capable of depositing 9.525 microCoulombs of charge per second per square centimeter. Having completed the first step 2 and being at second stage 3 of having created the latent electrostatic image, conversion of this image to a visible image is performed in the second step 4 of selectively attracting charged toner particles to the paper according to the strength of the electrostatic fields created by the latent electrostatic image. This process has many variations which are applicable and well known in the art. Having completed the second step and reached the third stage 5, where the developed visible image has been created on paper, no further stages or processing steps are required in the process. However, an optional fixing step may be included if it is desired to permanently affix the visible image to the paper. This two step process is very simple, much more so than for electrophotographic printing which requires, with plain paper, at least the additional steps of conversion of electrical information into optical information and transferring of the developed image to the paper. The advantage of such a simple electronic printing process is that it can easily be made highly reliable thereby enabling the use of it in operations where reliability of the process is of high importance such as in manufacturing or volume printing.

Figure 2:
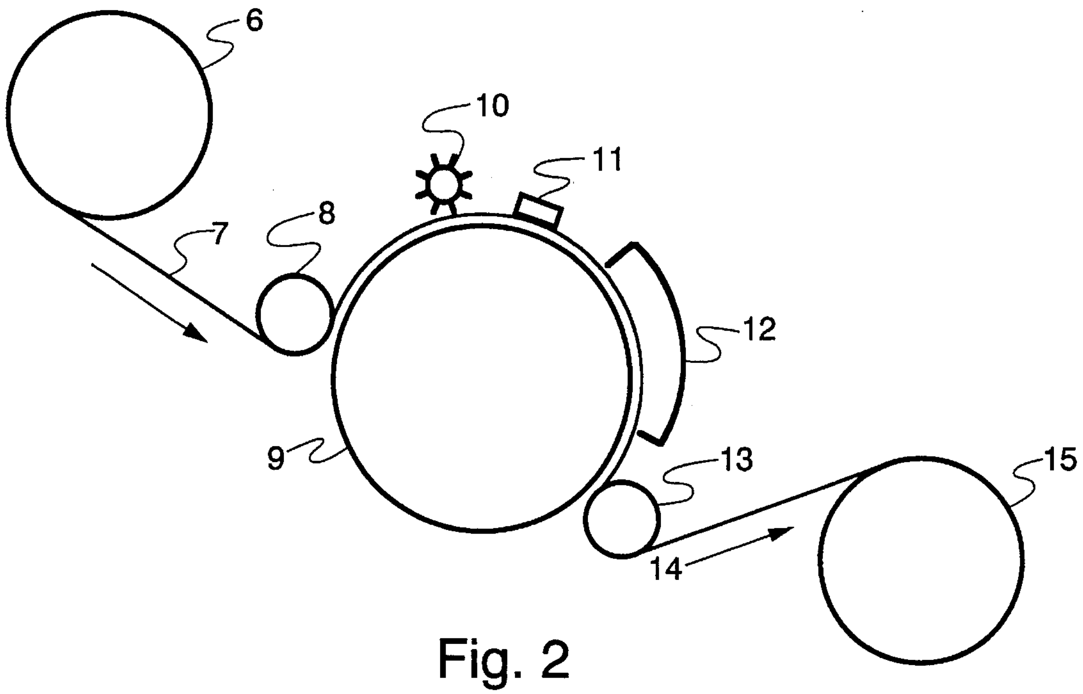
FIG. 2 is a schematic diagram of a print engine which implements the printing process of this invention.

In FIG. 2 a printing system is shown which is indicative of one possible implementation of the invention. Supply roll 6 provides plain paper 7 to the entrainment roller 8 which temporarily attaches the paper 7 to the conductive drum 9. An optional erasure station 10 discharges or pre-charges the exposed surface of the paper 7 to a known uniform potential. The erasure station 10 is used if the electronically controlled latent image charge deposition station 11 has electrical characteristics of a current source or very high impedance. If, however, the electronically controlled latent image charge station 11 has electrical characteristics of a voltage source or very low impedance, the erase station 10 may not be necessary. Image deposition 11 and development station 12 can be movable in relationship to each other to accommodate different line speeds or other substrates 7. In either case, the paper 7 is advanced through the electronically controlled latent image charge deposition station 11 which deposits the latent electrostatic image on the paper. The paper is further advanced through the development station 12 which develops the latent electrostatic image with toner and turns it into a visible image. The paper is still further advanced through entrainment roller 13 which, in conjunction with entrainment roller 8, maintains attachment of the paper to the conductive drum 9. Entrainment roller 13 may also optionally fix the developed or toned image to the paper, for example by providing a high pressure nip between it and conductive drum 9 and/or by heating the image thereby fusing it with the paper. The imaged paper 14 is advanced to take-up roll 15 upon which it is stored for later use. The supply and take-up rolls, entrainment rollers and conductive drum are operatively advanced in conjunction with the paper by any suitable means at a speed which will prevent substantial discharge of the latent electrostatic image between the charge deposition station 11 and the development station 12. It is to be understood that the printing system shown in FIG. 2 is representative of only one possible implementation of the invention. Substantial modifications of the printing system shown in FIG. 2 are possible without departing from the spirit or scope of the invention. For example, instead of using conductive drum 9, a conductive belt or other carrier may be used in order to optimize the utilization of space and/or energy in the system. In either case the function of providing a conductive carrier by which an electrical return path and the ability to set the electrical potential of the non-imaged side of the paper is preserved. Other possible modifications include substitution of the supply and/or take-up rolls to allow, for example, printing on two sides of the paper in cascaded print systems of the present invention. These and other modifications which retain the essence of the invented printing process are within the scope of this invention.

Figure 3:
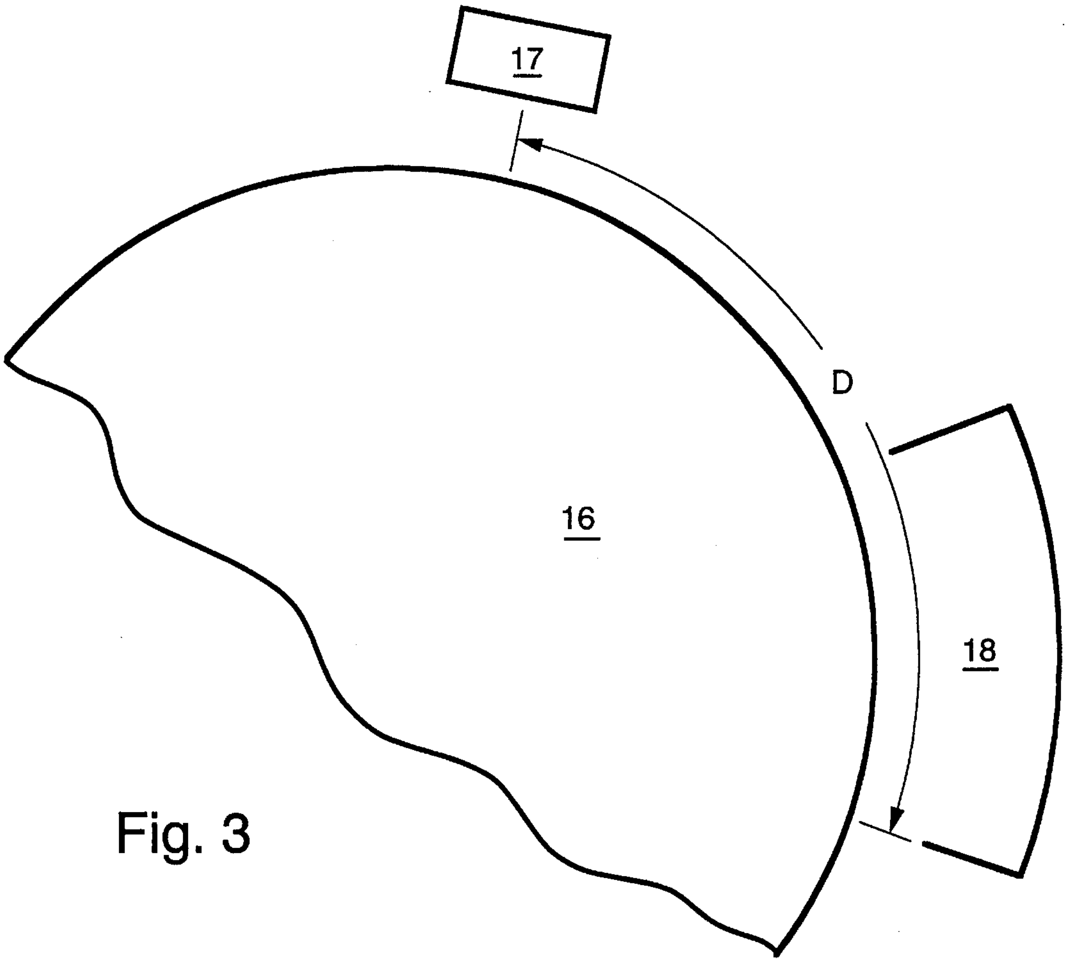
FIG. 3 is an expansion of the schematic diagram of the print engine which shows the variable distance between the position of charge deposition and the position of development of the resulting latent electrostatic image to make it visible.

FIG. 3 shows a conductive drum 16, electronically controlled latent image charge deposition station 17 and development station 18 which are identical to conductive drum 9, electronically controlled latent image deposition station 11 and development station 12 in FIG. 2. The distance "D" shown between the latent image deposition station and the development station may be variable and is the distance between the deposition of the charge which forms the latent image and the development of the latent image. This distance "D" is determined by the electrical time constant of the paper and the speed at which the paper is advanced between the latent image charge deposition station and the development station. In this invention, a requirement is that the latent electrostatic image remains substantially undischarged as the paper is advanced from the deposition station to the development station. By "substantially undischarged" is meant that the amount of charge in the latent image remaining at the development station is a significant percentage of the charge that was originally deposited at the charge deposition station. Important to this definition is the expectation that non-uniform discharging will take place; that is, some areas of the paper will discharge faster than other areas and, depending upon the application, this will show up as a reduction in the quality of the image. The degree to which this can be tolerated is dependent upon the final application. In general, it is believed that a discharging to 63% of the original charge, corresponding to one time constant of the paper, is acceptable for printing binary images or images that have two levels (e.g. white and black) only. For continuous tone images where absolute accuracy of the optical density is not important, discharging to 95% (i.e. retaining 95% of original charge) of the original charge corresponding to one third time constant of the paper is acceptable. For continuous tone images where absolute accuracy of the optical density is required, for example in the manufacture of color decorative surfaces where matching is important, discharging to 99% (i.e. retaining 99% of original charge) or better of the originally deposited charge, corresponding to one sixth time constant, may be required. However, given the application dependency of this definition, deviations from the above are included in the definition of "substantially undischarged" as long as images can be created which are suitable for the end application. The maximum distance "D" that can be used in this invention is that distance for which during the movement of paper from the charge deposition station to the development station, the latent image remains substantially undischarged.

Figure 4:
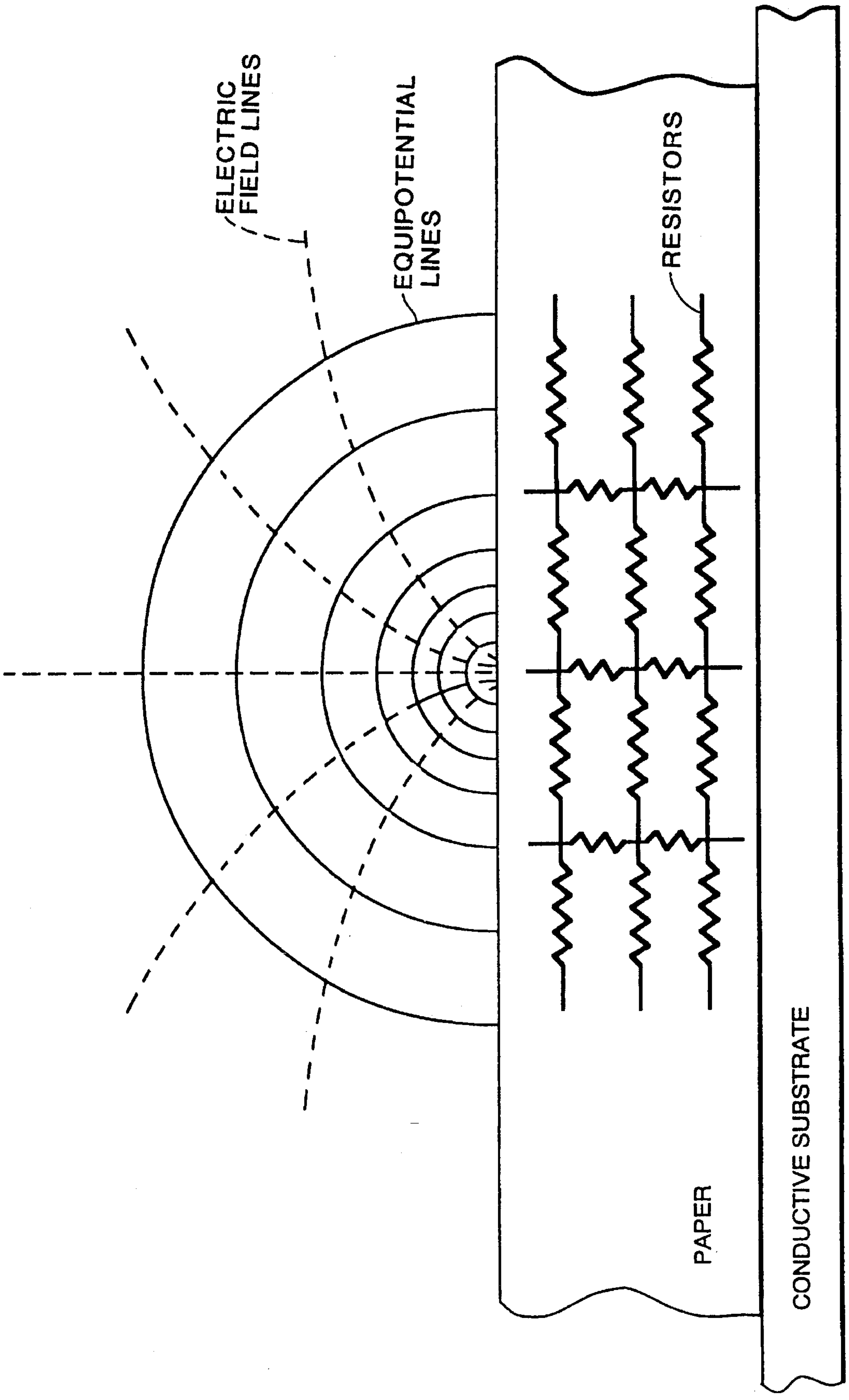
FIG. 4 is a schematic diagram of the charge associated with the latent electrostatic image on the paper and the charge leakage paths.

FIG. 4 shows charge comprising the latent image stored on the paper which is used as a dielectric. The solid circular lines above the paper are equipotential lines or points at which the potential is constant. These are similar to the lines of a contour map which indicate the areas of constant height. The dotted vertical lines are electric field lines. These lines indicate the direction of force that would be exerted on electrically charged particles. Within the paper are shown symbols for resistors oriented both vertically and horizontally. These indicate the leakage paths within the paper or the paper's resistivity. A plain paper of the type used in this invention is of substantially uniform composition and will tend to have resistivities that are of equal value in the horizontal and vertical directions. Near the surface of the paper the resistances may be different as a result of contamination that occurs during handling or surface treatments used to aid in handling. However, paper with surface treatments designed to equalize and/or increase the bulk and surface resistances are included in this invention. The paper used in this invention does not require a construction which is designed to cause it to have substantially higher resistivity on one surface as opposed to the other or a substantially higher surface resistivity than bulk resistivity in order to cause a multiple layer electrical structure to exist where part of the structure is for purposes of acting as a dielectric and a separate part of the structure is for purposes of acting as a conductor.

Further Examples and Preferred Embodiments

The following are examples of the specific electrographic printing process of the present invention.

EXAMPLE 3

Xerographic bond paper with a thickness of 0.003 inches and resistivity of $10^{12}$ ohms centimeters is supplied from a feed roll to an electrically conductive stainless steel belt which is maintained at ground potential (zero volts). The paper is attached to the belt in a nip created by a roller beneath the conductive belt and a second roller above the belt and paper. The second roller is heated to a temperature to increase the surface resistivity of the paper to a value similar to the bulk resistivity. The second roller is also held at an electrical potential of zero volts to maintain as little charge on the paper as possible. The belt with the paper attached is advanced to electrostatic latent image formation station which consists of a Delphax S3000 ionographic print cartridge and supporting drive electronics. The electrostatic imaging station is located at a third roller around which the belt and attached paper are made to go around. The mounting of the imaging station is such that a spacing between the top surface of the paper and the screen of the cartridge is maintained accurately at 0.010 inches. The screen electrode is maintained at −650 volts relative to the belt thereby maintaining a field to accelerate the charge from the ionographic print cartridge. The RF lines of the cartridge are driven with an AC waveform of 2500 volts peak to peak as is normal practice for this type of cartridge and at a frequency of 1.25 MHz. However, only four RF cycles are used for each pixel as opposed to the eight cycles normally used because of the lower capacitance per unit area presented by the paper as opposed to the dielectric drum normally used in Delphax printers. Charge is deposited imagewise on the paper creating a binary electrostatic image on the paper with a maximum apparent surface voltage of −250 volts. The electrostatically imaged paper and belt are advanced to a development station, the operative portion of which is ten inches from the ionographic cartridge. The development station comprises a toner reservoir in which single component toner of the type used by Delphax printers is stored, a rotating magnetic brush and a doctor blade used to set the height of the toner on the magnetic brush. The magnetic brush is made to be at zero volts relative to the belt and in close proximity to the electrostatically imaged paper such that toner particles are selectively removed from it by the electrostatic forces of the latent electrostatic image. The belt and the attached visibly imaged paper is next advanced to a fixing station. The fixing station comprises a xenon bulb and power supply. The xenon bulb is flashed with sufficient power and time to supply the energy required to melt the toner into the paper but at low enough power to ensure that the paper is not scorched. The belt and permanently imaged paper are advanced to a fourth roller. At this roller the paper is separated from the belt and wound on to a take-up roll. The belt moves back to the first roller. The belt is always taut because of tension supplied by the rollers and is automatically centered because of the profile of the fourth roller. The paper is tightly attached to the belt as described because it is always under tension applied between the feed and take-up rolls. The belt and paper are advanced together at a continuous speed of 125 feet per minute. All rollers move at the same speed as the belt and paper. This speed and the distance between the ionographic printing cartridge and development station ensures that the latent electrostatic image created on the paper is developed prior to the decay of the electrostatic image associated with one time constant of the paper. High quality black/white binary images are created under these conditions.

EXAMPLE 4

In this example a magazine quality paper with a width of 9.5 inches and thickness of 0.003 inches, a smooth finish and high clay content is used. The clay used in the paper is calcined clay in order to achieve a bulk resistivity of $10^{13}$ ohms centimeters and a bulk time constant of at least 4.5 seconds. It is supplied from a feed roll to an electrically conductive drum which is maintained at ground potential (zero volts). The paper is attached to the drum in a nip created by the drum and a first roller above the drum and paper. The first roller is heated to a temperature which increases the surface resistivity of the paper to a value similar to its bulk resistivity. The first roller is also held at an electrical potential of zero volts to maintain as little charge on the paper as possible. The drum with the paper attached is advanced to an erasure station which removes any residual charge remaining on the paper. The erasure station is an AC corotron similar to that used in the erasure station of Delphax printers. After complete discharge of the paper the paper and drum are together advanced to the electrostatic latent image formation station. This consists of a cathode ray tube with a very thin metallic film window which allows a portion of the electron beam created in the tube to be projected beyond the tube. This type of cathode ray tube and electrostatic latent image creation system is described in an article titled "A Novel Electron-Beam Printing Technique" written by Guillemot, Poussier and Roche and published by the SPSE in the advanced printing of paper summaries for the Fourth International Congress on "Advances in Non-Impact Printing Technologies" which was held in New Orleans, La. on Mar. 20–25, 1988 and is incorporated into this example by reference. The electrical potential of the window of the CRT (cathode ray tube) is made to be at −650 volts relative to the drum and the distance between the window and the drum is made to be 0.010 inches. This is to ensure that minimal diffusion of the electrons emitted from the CRT occurs as they travel to the paper by causing a high field between the window and the surface of the paper. The electron beam current created by the CRT is set to be a maximum of −22 microAmperes, thus generating a maximum apparent surface potential on the paper of −250 volts at the operative paper velocity of 125 feet per minute. The electron beam current from the cathode ray tube is linearly modulated according to the desired optical density of the developed image such that maximum current corresponds to maximum optical density. The electrostatically imaged paper and drum are advanced to a development station, the end of the operative portion of which is within 18 inches of the window of the CRT. The development station comprises a toner reservoir in which liquid toner is stored; a series of six closely spaced rollers of 0.75 inches diameter, the surfaces of which are made to be parallel to and at a distance of 0.010 inches from the paper on the drum and held at an electrical potential of zero volts; a pump which pumps toner from the reservoir to the interfaces between the rollers and the paper; a catch basin which catches excess toner from the rollers and returns it to the reservoir; and a last reverse roller parallel to the paper and as close as possible to it which skims off the excess liquid on the paper. The design of this development station is similar to the design of the development station of the Savin 7450 photocopier and embodies the same principles of design. In particular, the use of liquid toners and this configuration of development station allows for nearly complete cancellation of the latent electrostatic image by the toner particles resulting in very high quality continuous tone development characteristics. The drum and attached visibly imaged paper is next advanced to a fixing station. The fixing station comprises a heated silicone covered roller which, in conjunction with the drum, forms a nip in which the paper is made to move. This type of fixing roller is similar to that used in a number of existing photocopiers and laser printers. The temperature of the roller is high enough to transfer sufficient energy into the toner to cause it to melt and stick on the surface of the paper. The drum and permanently imaged paper are advanced to a third separation roller. At this roller the paper is separated from the drum and wound on to a take-up roll. The paper is tightly attached to the drum because it is always under tension applied between the feed and take-up rolls. As previously described, the drum and paper are advanced together at a continuous speed of 125 feet per minute. All rollers move at the same speed as the drum and paper. This speed and the distance between the latent image formation station and the development station ensures that the latent electrostatic image created on the paper is developed prior to the decay of the electrostatic image associated with one sixth time constant of the paper. High quality continuous tone images are created under these conditions. A photographic quality color printer is made by cascading four drums and associated stations using magenta, yellow, cyan and black toners.

EXAMPLE 5

In this example a magazine quality paper (clay coated paper) with a width of 9.5 inches and thickness of 0.003 inches, a smooth finish and high clay content is used. The clay used in the paper is calcined clay in order to achieve a bulk resistivity of $10^{13}$ ohms centimeters and a bulk time constant of at least 4.5 seconds. It is supplied from a feed roll to an electrically conductive drum which is maintained at ground potential (zero volts). The paper is attached to the drum in a nip created by the drum and a first roller above the drum and paper. The first roller is heated to a temperature which increases the surface resistivity of the paper to a value similar to its bulk resistivity. The second roller is also held at an electrical potential of zero volts to maintain as little charge on the paper as possible. The drum with the paper attached is advanced to an erasure station which removes any residual charge remaining on the paper. The erasure station is an AC corotron similar to that used in the erasure station of Delphax printers. After complete discharge of the paper the paper and drum are together advanced to the electrostatic latent image formation station. This consists of a special purpose ionographic print cartridge and supporting electronics. The ionographic print cartridge is essentially of the same design as other Delphax ionographic print cartridges but has been designed to have 16 RF lines and optimized for high frequency operation with an RF frequency of 10 megahertz. As is generally known by those who work in the art, at these RF frequencies the charge emitted by the cartridge and deposited on paper is predominantly electrons, not ions. The setup of the cartridge relative to the paper is identical to that in Example 1. In this example continuous tone images are produced. The drive waveforms to the cartridge are modulated such that the charge packet produced during each RF cycle has a different magnitude where the relationship between the magnitudes of the individual charge packets is a factor of two. Hence the magnitude of each succeeding charge packet is either twice that of the previous charge packet or half that of the previous charge packet. The details of how this is performed is described by Thomson in U.S. Pat. No. 4,992,807 and is incorporated in this example by reference. The use of a binary weighting factor for the charge packets allows the binary number representing the desired density to be used directly in modulating the state of the finger drive waveform. 20 RF cycles at 10 MHz are used per RF line where two cycles are used for each of the eight bits representing the desired density and four cycles are used for ensuring the envelope amplitude of the RF drive signal. The sequencing of the RF lines is such that an operative paper velocity of 500 feet per minute is maintained. Charge is deposited imagewise on the paper creating an essentially continuous tone electrostatic image on the paper with a maximum apparent surface voltage of −250 volts. The electrostatically imaged paper and drum are advanced to a development station, the end of the operative portion of which is within 145 inches of the special purpose ionographic print cartridge. Any suitable development system may be used in this invention, for example, the development station comprises a toner reservoir in which liquid toner is stored; a fine pitch screen made to be essentially parallel to and a distance of 0.020 inches from the paper and entrained around two rollers which move it at a velocity somewhat slower than the velocity of the paper, all of which are held at an electrical potential of zero volts; a pump which pumps toner from the reservoir to the interfaces between the screen and the paper a continuous supply of fresh toner between the screen and paper; a catch basin which catches excess toner from the screen and returns it to the reservoir; and a reverse roller parallel to the paper and as close as possible to it which skims off the excess liquid on the paper. The design of this development station ensures the maximum availability of undepleted toner and highest field strength over an area to motivate development thereby providing for high speed development in a development station of small size. The use of liquid toners and this configuration of development station allows for nearly complete cancellation of the latent electrostatic image by the toner particles resulting in very high quality continuous tone development characteristics. The drum and attached visibly imaged paper is next advanced to a fixing station. The fixing station comprises a xenon bulb and power supply. The xenon bulb is flashed with sufficient power and time to supply the energy required to melt the toner onto the paper but at low enough power to ensure that the paper is not scorched. The drum and permanently imaged paper are advanced to a second separation roller. At this roller the paper is separated from the drum and wound onto a take-up roll. The paper is tightly attached to the drum because it is always under tension applied between the feed and take-up rolls. As previously described, the drum and paper are advanced together at a continuous speed of 500 feet per minute. The rollers move at the same speed as the drum and paper. This speed and the distance between the ionographic printing cartridge and the development station ensures that the latent electrostatic image created on the paper is developed prior to the decay of the electrostatic image associated with one third time constant of the paper. High quality continuous tone images are created under these conditions. A magazine quality color printer is made by cascading four drums and associated stations using magenta, yellow, cyan and black toners.

EXAMPLE 6

In this example, a high quality grade of cellulosic paper having a width of 6.0 inches and a nominal thickness of 0.005 inches was used. The surfaces of both sides of the paper contain a high concentration of polyethylene resin which can be either applied "on-machine" during sizing of the paper and prior to drying and calendering or "off-machine" finishing using conventional paper coating techniques with other surface-finishing operations.

The resulting surfaces of both sides of the web of paper were smooth and comparable to some of the highest quality printing papers available. On one side of the paper, the surface coating contained mainly $TiO_2$ (rutile) and barium sulfate as fillers in the range of 5.0%. The opposite side of the paper can be identical in filler content, however, the polyethylene coating on this side contained no filler. The coating on both sides measured between 0.5 to 1.0 mils in thickness.

The dual-sized cellulosic paper was dispensed from an unwind stand and conveyed by a stainless steel belt. The tension of the paper against the positively driven belt insured intimate contact between the backside of the paper containing the unfilled polyethylene surface coating and the moving belt which was at ground potential. The paper plus belt were conveyed beneath an ac discharge corona which neutralized the surface of the paper plus applied a slight positive charge to eliminate background in the non-image areas.

A novel ionographic print head manufactured by Delphax Systems Inc. was used to apply charge in an image-like pattern to the coated side of the paper containing the fillers. It was operated by an electronics package comprising an rf drive circuit described in Bowers, U.S. Pat. No. 5,025,273 and a grey-scale digital control system described in Bowers, et. al. U.S. Pat. No. 5,170,188.

The ionographic print head was spaced 10 mils above the surface of the moving paper and belt. Data was supplied to the print head from an image buffer which contained a digital representation of the pattern to be electronically imaged on the coated paper surface. Using pulse width modulation techniques, bursts of negative charge were deposited in the form of the original pattern with 127 levels of charge control. Pulse width modulation of the ionographic head resulted in negative charge being deposited on the surface of the paper in the form of the original pattern.

The paper was then conveyed through a platen-like developer with black liquid toner DDB-42 as supplied by Hilord Chemical Corporation. The toner was at approximately 1% concentration in Isopar G carrier. Full development of the multi-shade latent image was accomplished in black color where the optical density ranged from a value of zero (0) to 1.4 as measured with an X-Rite Densitometer, Model 404, manufactured by X-Rite, Grandville, Mich.

After image development, the Isopar G was evaporated from the toned surface and the image fused using conventional toner fusing techniques. The toned image was then re-rolled. Alternately, multiple colors can be applied on top of the first image and sequential images to produce a full multi-color print on the same side of the paper prior to re-rolling. Techniques combining the printing apparatus and process and the electronic imaging system described in Examples 5 and 7 of U.S. Pat. No. 5,187,501 can be used. High resolution process color printing has been produced on paper using these techniques.

The second pass through the printer consisted of dispensing the previously imaged and toned paper containing the black pattern from an unwind stand and putting this side against the moving stainless steel belt. The same steps were repeated for the non-imaged side of the paper. There was sufficient tension between the previously imaged and toned side of the paper and the moving belt to provide an excellent ground plane for application of the second latent image to the backside of the paper containing the unfilled polyethylene surface coating.

After electronic image placement, toner development and Isopar G removal, it was apparent that the fused image on the second side of the paper had excellent tonal quality and was not affected by the image previously applied to the other side. Thus, printing of both sides of a plain paper without ghosting was demonstrated utilizing this invention.

This example demonstrates the printing of both sides of a paper web using two separate passes using the same printing apparatus having a stainless steel belt. Each pass through the printer could apply multiple images to both sides of the paper and could involve one or more stations including:

latent image formation, developing and Isopar removal. Both sides of the paper can be imaged and toned with two in-line printing presses containing stainless steel belts, one press printing each side of the paper. Also, a sheet of paper could be imaged and developed using one or more stations where a suction roll is the conductive substrate.

However, the invention is not limited to this sequence of steps and the stainless steel belt can be replaced with any suitable conductive means which provides an appropriate ground beneath the latent image formation station. For example, a latent image formation station, developer and Isopar G removal system for each color can be arranged alternately on each side of the moving web to produce images simultaneously on both sides of the paper web. In this arrangement, the ground plane beneath the image formation unit could be conductive rollers.

Many charge retentive substrates used in the present invention have heretofore not been usable in prior art electrographic processes. Since specific parameters have been determined by the present process and apparatus many more substrates can now be used in electrography including plain papers. These papers can be successfully imaged if developed within a given period of time or distance in a system as determinable from the process parameters above noted.

The preferred and optimumly preferred embodiments of the present invention have been described herein and shown in the accompanying drawings to illustrate the underlying principles of the invention but it is to be understood that numerous modifications and ramifications may be made without departing from the spirit and scope of this invention.

What is claimed is:

1. A process for imaging in an electrographic system comprising depositing at an image station a charge in imagewise configuration directly on a charge retentive substrate to be developed, developing said substrate within a distance in said system from said image station, said distance determined from the formula $$D=TC\times S\times QF$$

Wherein:

D is equal to a distance between latent image deposition and development in arbitrary units;

TC is a time constant of the charge retentive substrate in seconds;

S is a speed in said system of the substrate in said units as D per second; and

QF is equal to a number of time constants of the substrate used in the process.

2. The process of claim 1 wherein the charge retentive substrate has a time constant of at least 100 milliseconds.

3. The process of claim 1 wherein the charge retentive substrate has a time constant of about from 100 milliseconds to 1000 seconds.

4. The process of claim 1 wherein said distance D between the image station and development of said substrate is adjustable.

5. The process of claim 1 wherein said charge retentive substrate is plain paper.

6. The process of claim 1 wherein said charge retentive substrate is a multilayered paper wherein each layer has different dielectric properties.

7. The process of claim 1 wherein said charge retentive surface is a paper having a substantially uniform composition and devoid of a two layered structure of a conductive layer and a dielectric layer.

8. The process of claim 1 wherein said charge retentive surface is a dielectric paper having a conductive layer and coated thereon a dielectric layer, said dielectric layer having a time constant of at least 100 milliseconds.

9. The process of claim 1 wherein said substrate after development is removed from the system and the image is transferred to a receiving medium.

10. A process comprising in a system depositing an electrostatic charge in imagewise configuration directly on a charge retentive surface to be developed, developing said surface within a distance and time period from point and time of depositing said charge, said distance and time period determined by the formula:

$$D=TC\times S\times QF$$

wherein D is a distance in arbitrary units in said system from a point of depositing said charge to the point of development of said charge;

TC is a time constant of said charge retentive surface;

S is the speed in said system of said surface in said units as D per second; and QF is equal to a number of time constants of the charge retentive surface used in said system.

11. The process of claim 10 wherein the charge retentive substrate has a time constant of at least 100 milliseconds.

12. The process of claim 10 wherein the charge retentive substrate has a time constant of from about 100 milliseconds to 1000 seconds.

13. The process of claim 10 wherein said charge retentive substrate is plain paper.

14. The process of claim 10 wherein the distance D between the depositing of an electrostatic charge and development of said substrate is adjustable.

15. The process of claim 10 wherein said substrate after development is removed from the system and the image is transferred to a receiving medium.

16. The process of claim 10 wherein said charge retentive substrate is a multilayered paper wherein each layer has a different dielectric property.

17. The process of claim 10 wherein said charge retentive surface is a paper having a substantially uniform composition and devoid of a two layered structure of a conductive layer and a dielectric layer.

18. The process of claim 10 wherein said charge retentive surface is a dielectric paper having a conductive layer and coated thereon a dielectric layer, said dielectric layer having a resistivity of at least $10^{14}$ ohms centimeters.

19. A non-impact printer apparatus comprising a system having in combination a substrate supply station, an imaging station having means to deposit a latent electrostatic image upon a charge retentive substrate, a developing station, a separation station, and means for controlling image development of said substrate within a distance in said system, said distance determined from the formula:

$$D=TC\times S\times QF$$

Wherein:

D is equal to the distance between latent electrostatic image deposition and development in arbitrary units;

TC is the time constant of the charge retentive substrate in seconds;

S is the speed in the system of the substrate in the same units as D per second; and QF is equal to the number of time constants of the substrate used in the process.

20. The apparatus of claim 19 wherein the time constant is at least 100 milliseconds.

21. The apparatus of claim 19 wherein said charge retentive substrate is plain paper.

22. The apparatus of claim 19 wherein said charge retentive substrate is a multilayered paper wherein said layers have different dielectric properties.

23. The apparatus of claim 19 wherein said charge retentive surface is a paper having a substantially uniform composition and devoid of a two layered structure of a conductive layer and a dielectric layer.

24. The apparatus of claim 19 wherein said charge retentive surface is a dielectric paper having a conductive layer and coated thereon a dielectric layer, said dielectric layer having a resistivity of at least $10^{14}$ ohms centimeters.

25. The apparatus of claim 19 wherein the distance D between a depositing of an electrostatic charge and development of said substrate is adjustable.

26. An apparatus including an imaging system comprising means for depositing at an imaging station an electrostatic charge in imagewise configuration directly on a charge retentive surface to be developed, means for developing said surface within distance and time period from the point and time of depositing said charge, said distance and time period determined by the formula:

$$D=TC \times S \times QF$$

Wherein:

D is the distance in said system from the point of depositing said charge to the point of development of said charge;

TC is the time constant of said charge retentive surface;

S is the speed in said system of said surface in the same units as D per second; and QF is equal to the number of time constants of the charge retentive surface used in said system.

27. The apparatus of claim 26 wherein the charge retentive substrate has a time constant of at least 100 milliseconds.

28. The apparatus of claim 26 wherein the charge retentive substrate has a time constant of from about 100 milliseconds to about 1000 seconds.

29. The apparatus of claim 26 wherein said charge retentive substrate is plain paper.

30. The apparatus of claim 26 wherein said charge retentive substrate is a multilayered paper wherein each layer has dielectric properties.

31. The apparatus of claim 26 wherein said charge retentive surface is a paper having a substantially uniform composition and devoid of the two layered structure of a conductive layer and a dielectric layer.

32. The apparatus of claim 26 wherein said charge retentive surface is a dielectric paper having a conductive layer and coated thereon a dielectric layer, said dielectric layer having a resistivity of at least $10^{14}$ ohms centimeters.

33. The apparatus of claim 26 wherein the distance D between the depositing of an electrostatic charge and development of said substrate is adjustable.

34. The apparatus of claim 26 wherein said substrate after development is removed from the system and the image is transferred to a receiving medium.

* * * * *